US009626785B2

(12) United States Patent
Bostick et al.

(10) Patent No.: US 9,626,785 B2
(45) Date of Patent: Apr. 18, 2017

(54) USING A BENDING PATTERN TO ARRANGE FILES ON A FLEXIBLE DISPLAY

(71) Applicant: International Business Machines Corporation, Armonk, NY (US)

(72) Inventors: James E. Bostick, Cedar Park, TX (US); John M. Ganci, Jr., Cary, NC (US); Sarbajit K. Rakshit, Kolkata (IN); Craig M. Trim, Sylmar, CA (US)

(73) Assignee: International Business Machines Corporation, Armonk, NY (US)

( * ) Notice: Subject to any disclaimer, the term of this patent is extended or adjusted under 35 U.S.C. 154(b) by 107 days.

(21) Appl. No.: 14/665,262

(22) Filed: Mar. 23, 2015

(65) Prior Publication Data
US 2016/0284047 A1 Sep. 29, 2016

(51) Int. Cl.
*G06T 11/60* (2006.01)
(52) U.S. Cl.
CPC .................... *G06T 11/60* (2013.01)
(58) Field of Classification Search
CPC ......... G06F 1/1652; G06F 2203/04102; G06F 17/30719; G06F 17/30616; G06F 17/30625; G06F 3/0481; G06F 3/04815; G09G 2380/02
See application file for complete search history.

(56) References Cited

U.S. PATENT DOCUMENTS

| 7,456,823 B2 * | 11/2008 | Poupyrev | G06F 3/011 178/18.06 |
|---|---|---|---|
| 8,466,873 B2 | 6/2013 | Vertegaal et al. | |
| 2010/0011291 A1 | 1/2010 | Nurmi | |
| 2012/0306910 A1 * | 12/2012 | Kim | H04N 13/04 345/619 |
| 2013/0154971 A1 | 6/2013 | Kang et al. | |
| 2014/0176421 A1 | 6/2014 | Chen | |
| 2016/0182900 A1 * | 6/2016 | Leng | G09G 3/20 348/51 |

FOREIGN PATENT DOCUMENTS

| EP | 2733592 A2 | 5/2014 |
| WO | 2011005318 A2 | 1/2011 |

OTHER PUBLICATIONS

"Euclidean minimum spanning tree", Wikipedia, the free encyclopedia, page last modified Apr. 15, 2014, <http://en.wikipedia.org/wiki/Euclidean_minimum_spanning_tree>.

* cited by examiner

*Primary Examiner* — Antonio A Caschera
(74) *Attorney, Agent, or Firm* — Edward P. Li

(57) ABSTRACT

A method, a computer program product, and a computer system for using a bending pattern to arrange files on a flexible display of an electronic device. The computer-implemented method includes identifying a bending line on the flexible display in response to bending the flexible display by a user, calculating an affected area on the flexible display, calculating a bending pattern, calculating relative positions of points on the flexible display within the bending pattern, categorizing the points based on file weight attributes, and arranging the files such that light weighted files float over heavy weighted files on the flexible display.

17 Claims, 6 Drawing Sheets

USING A BENDING PATTERN TO ARRANGE FILES ON A FLEXIBLE DISPLAY

TECHNICAL FIELD OF THE INVENTION

The present invention relates generally to arranging files on a display, and more particularly to arranging files on a flexible display using a bending pattern.

BACKGROUND

On an operating system such as Windows, there are folders or desktop filters to automatically arrange files by different attributes such as date, file type, etc. A user can set predefined views for listing content or change view for each folder as needed. The files are displayed on, for example, a traditional flat screen display.

A flexible display is different from the more prevalent traditional flat screen displays used in most electronics devices. In the recent years there has been a growing interest from numerous consumer electronics manufacturers to apply this display technology in e-readers, mobile phones and other consumer electronics. The advantage of a flexible display is that any type of bending shapes can be given any place on the flexible display. In other words, the flexible display has different bending patterns.

SUMMARY

In one aspect, a method for using a bending pattern to arrange files on a flexible display of an electronic device is provided. The method is implemented by a processor on the electronic device. The method includes identifying a bending line on the flexible display, in response to bending the flexible display by a user. The method further includes calculating an affected area on the flexible display, calculating a bending pattern, calculating relative positions of points on the flexible display within the bending pattern, and categorizing the points based on file weight attributes. In the method, the files are arranged such that light weighted files float over heavy weighted files on the flexible display.

In yet another aspect, a computer program product for using a bending pattern to arrange files on a flexible display of an electronic device is provided. The computer program product comprises a computer readable storage medium having program code embodied therewith. The program code is executable to: identify, by a processor of the electronic device, a bending line on the flexible display, in response to bending the flexible display by a user; calculate, by the processor, an affected area on the flexible display; calculate, by the processor, a bending pattern; calculate, by the processor, relative positions of points on the flexible display within the bending pattern; categorize, by the processor, the points based on file weight attributes; and arrange, by the processor, the files such that light weighted files float over heavy weighted files on the flexible display.

In yet another aspect, a computer system for using a bending pattern to arrange files on a flexible display of an electronic device is provided. The computer system comprises one or more processors, one or more computer readable tangible storage devices, and program instructions stored on at least one of the one or more computer readable tangible storage devices for execution by at least one of the one or more processors. The program instructions are executable to identify, by a processor of the electronic device, a bending line on the flexible display, in response to bending the flexible display by a user. The program instructions are executable to calculate, by the processor, an affected area on the flexible display. The program instructions are executable to calculate, by the processor, a bending pattern. The program instructions are executable to calculate, by the processor, relative positions of points on the flexible display within the bending pattern. The program instructions are executable to categorize, by the processor, the points based on file weight attributes. The program instructions are executable to arrange, by the processor, the files such that light weighted files float over heavy weighted files on the flexible display.

DETAILED DESCRIPTION

Embodiments of the present invention use a bending pattern on a flexible display of an electronic device and weight attributes files as a new way to control and arrange files for display. In embodiments of the present invention, a flexible display bending pattern is used to control or manipulate the display order of files.

In one embodiment, one or more computer programs arrange files, such as images, video, audio, and documents, on a flexible display by weight attributes. Each file has a weight attribute, so that one file is lighter than another file. By defining different attributes (e.g., file size, dimensions, context relevancy, confidentiality, and other meta data) for file weight attributes, different types of bending patterns on the flexible display can be used to arrange files based on an association between the weight attributes of the files and the bending pattern.

Embodiments of the present invention are now described in detail with reference to the accompanying FIGs.

Figure 1:
FIG. 1 is a diagram illustrating photographs displayed on a flexible display without bending applied, in accordance with one embodiment of the present invention.

FIG. 1 is a diagram illustrating photographs displayed on a flexible display without bending applied, in accordance with one embodiment of the present invention. FIG. 1 shows top view 101 of the flexible display. Top view 101 depicts opened multiple photographs on the flexible display, or opened folders with multiple images. Top view 101 shows that the files are arranged haphazardly or can be listed using more traditional methods. Side view 102 of the flexible display shows that no bending is applied. In embodiments of the present invention, in response to user's bending the flexible display, one or more computer programs on an electronic device with the flexible display identify an applied bending pattern on the flexible display, and arrange the files impacted by the bending according to the file weight attributes.

Figure 2A:
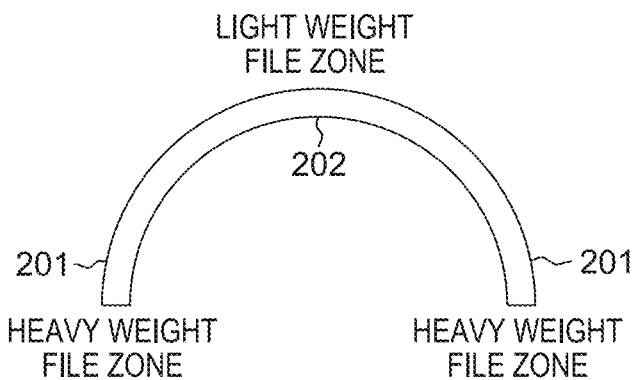
FIG. 2A, FIG. 2B, and FIG. 2C show different bending patterns of a flexible display and mapping the bending pattern to file weight attributes, in accordance with one embodiment of the present invention.
Figure 2B:
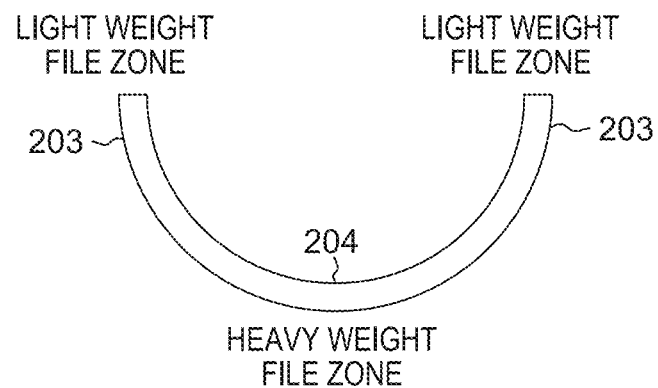
Figure 2C:
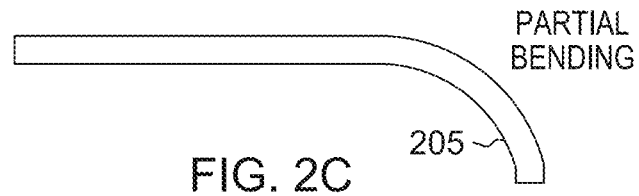

FIG. 2A, FIG. 2B, and FIG. 2C show different bending patterns of a flexible display and mapping the bending pattern to file weight attributes, in accordance with one embodiment of the present invention. FIG. 2A, FIG. 2B, and FIG. 2C show examples of different types of bending patterns of the flexible display that can be associated or mapped to the file weight attributes. A user can bend the entire flexible display device (for example, as shown in FIG. 2A and FIG. 2B) or bend the partial flexible display (for example, as shown in FIG. 2C). Based on the bending patterns, the affected files are reorganized or arrange based on selected file weight attributes. During convex bending shown in FIG. 2A, light weighted files are concentrated in the central area (202), and heavy weight files go to both corners (201) of the flexible display. During concave bending shown in FIG. 2B, heavy weighted files are concentrated in the central area (204), but light weight files go to the both corners (203) of the flexible display. This arrangement of files can be used to help organize the files for file management. As shown in FIG. 2C, the user applies bending in a partial area (205), accordingly files present in the partial area will be rearranged. In another embodiment, when the user can lift four corners of the flexible display, heavy weighted files go to the center of the flexible display and are arranged in a concentric circle pattern around the center.

Figure 3:
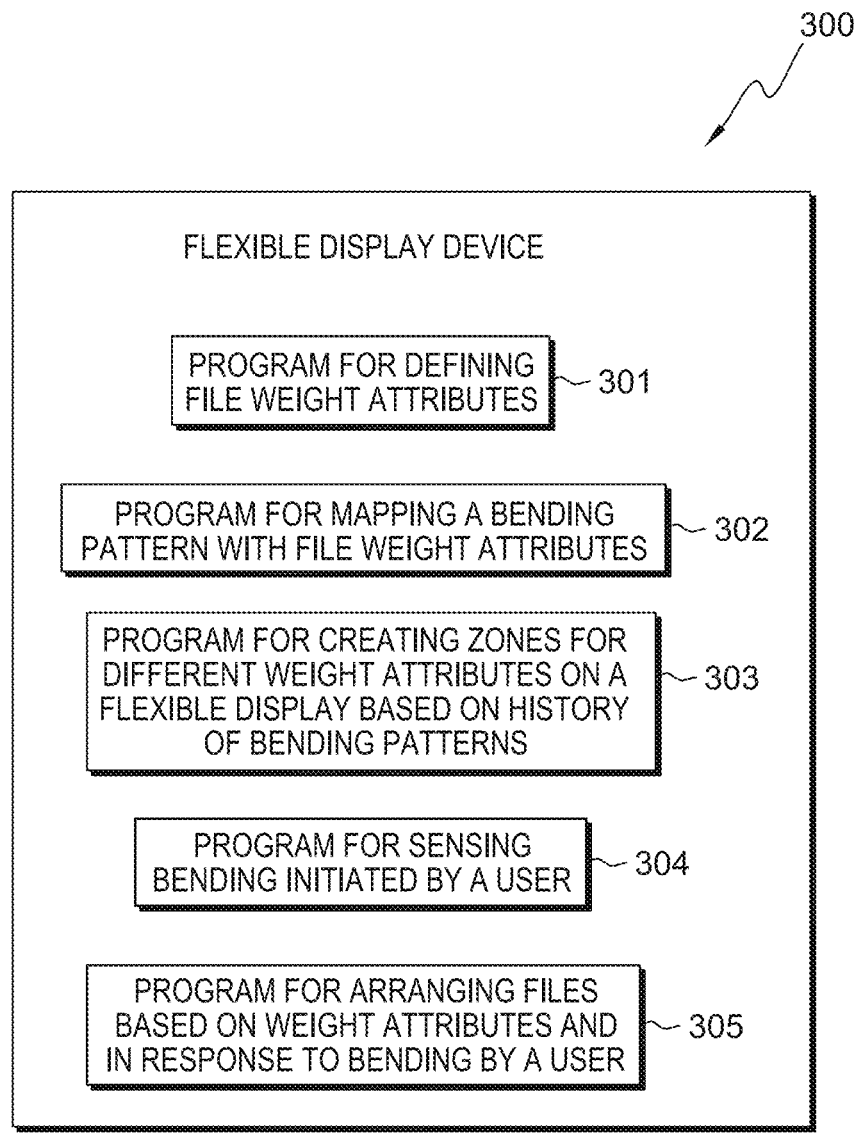
FIG. 3 is a diagram illustrating computer programs for arranging files on a flexible display using a bending pattern on an electronic device with a flexible display, in accordance with one embodiment of the present invention.

FIG. 3 is a diagram illustrating programs 301-305 on electronic device 300 with a flexible display, in accordance with one embodiment of the present invention. Electronic device 300 with the flexible display comprises program 301 for defining file weight attributes, program 302 for mapping a bending pattern with file weight attributes, program 303 for creating zones for different weight attributes on the flexible display based on history of bending patterns, program 304 for sensing bending initiated by a user, and program 305 for arranging files based on weight attributes and in response to bending by a user.

Figure 4:
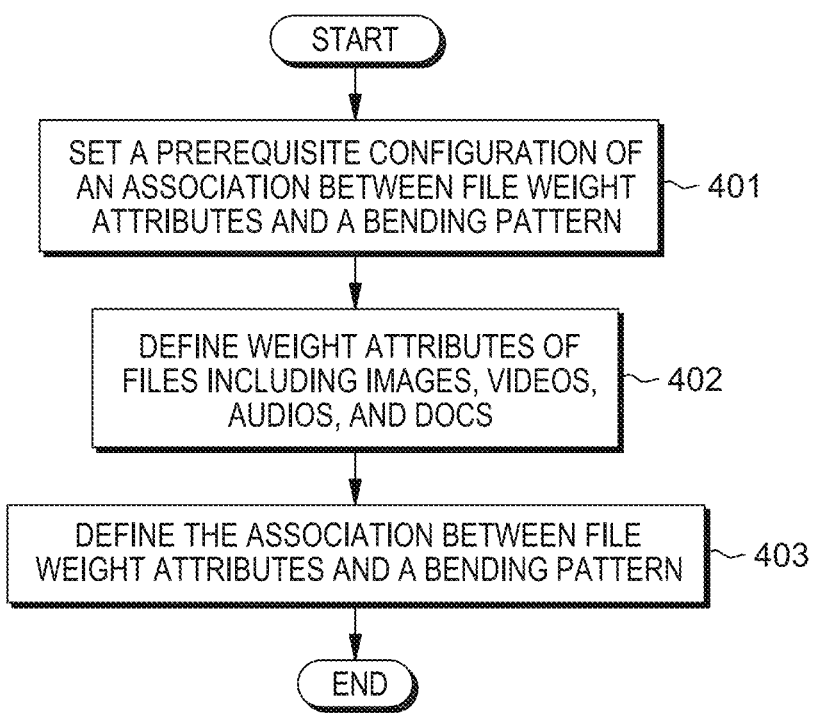
FIG. 4 is a flowchart showing operational steps of defining an association between file weight attributes and a bending pattern, in accordance with one embodiment of the present invention.

FIG. 4 is a flowchart showing operational steps of defining an association between file weight attributes and a bending pattern, in accordance with one embodiment of the present invention. In an embodiment, the steps are implemented by one or more computer programs of programs 301-305 (shown in FIG. 3) on an electronic device with a flexible display. At step 401, the one or more computer programs set a prerequisite configuration of an association between file weight attributes and a bending pattern. At step 402, the one or more computer programs define weight attributes of files. The files include images, videos, audios, and documents. The weights attributes of files can be dynamically selected by the user. The file weight attributes can be defined based on different attributes of the files, such as file size, dimensions, context relevancy, confidentiality, other metadata, etc. At step 403, the one or more computer programs define an association between a bending pattern and file weight attributes. For example, as shown in FIG. 2A, FIG. 2B, and FIG. 2C, different types of bending patterns can be associated or mapped to the file weight attributes.

Figure 5:
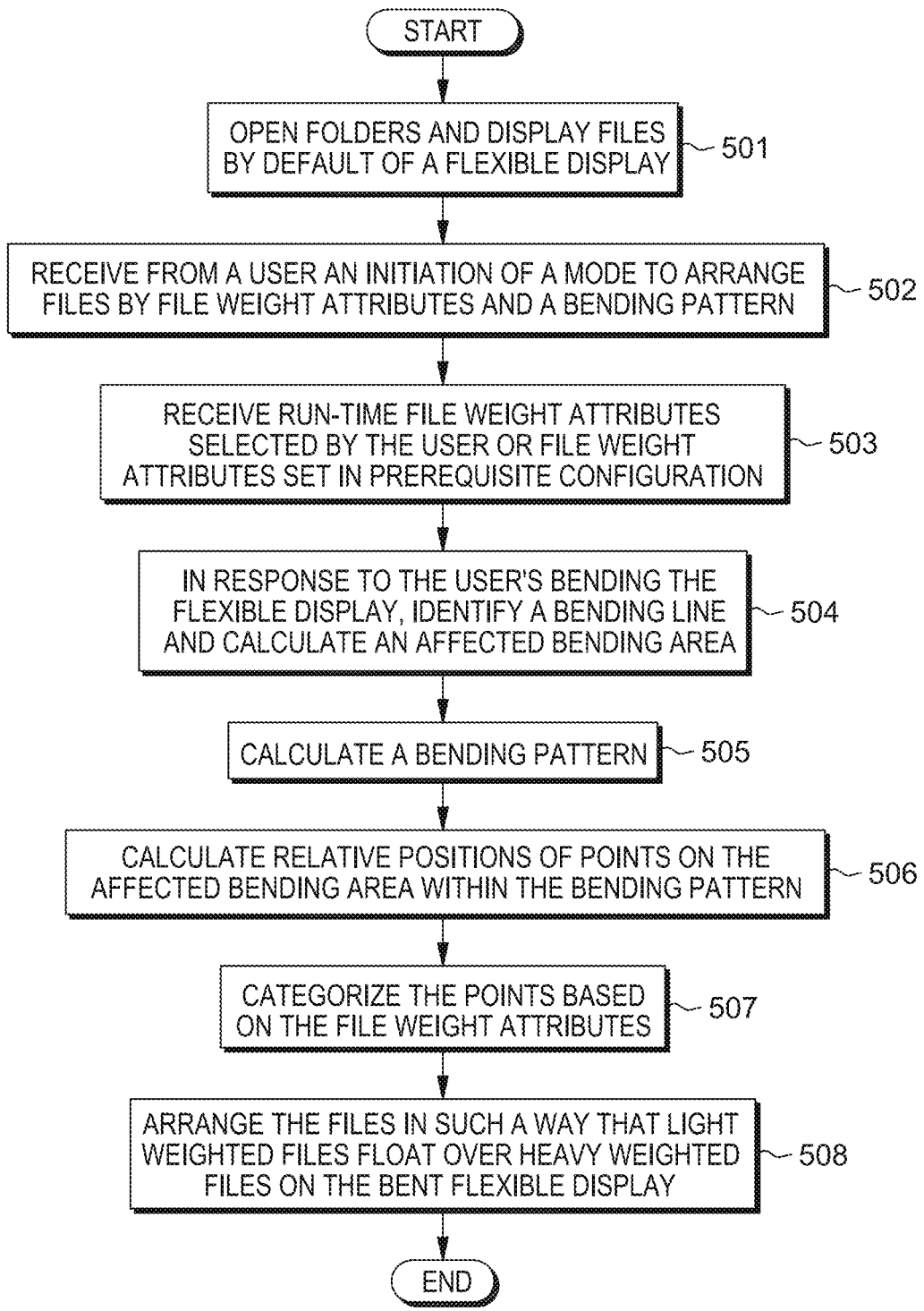
FIG. 5 is a flowchart showing operational steps of using a bending pattern to arrange files on a flexible display, in accordance with one embodiment of the present invention.

FIG. 5 is a flowchart showing operational steps of using a bending pattern to arrange files on a flexible display, in accordance with one embodiment of the present invention. The steps are implemented by one or more computer programs of programs 301-305 (shown in FIG. 3) on an electronic device with a flexible display. At step 501, the one or more computer programs open folders and displays files by default of a flexible display. At step 502, the one or more computer programs receive from a user an initiation of a mode to arrange files by file weight attributes and a bending pattern. At step 503, the one or more computer programs receive run-time file weight attributes selected by the user or file weight attributes set in a prerequisite configuration. At step 504, the one or more computer programs identify a bending line and calculate an affected bending area, in response to bending the flexible display by the user. Upon the bending pattern of flexible display, a sensor installed in the flexible display will identify the bending line and accordingly will calculate affected area. In this case, files present in the affected area are candidate files for being arranged for display. At step 505, the one or more computer programs calculate a bending pattern, such as concave, convex, or any other bending shape or pattern. At step 506, the one or more computer programs calculate relative positions of points on the affected area within the bending pattern. The calculation determines which point (portion of flexible display) is above another point. At step 507, the one or more computer programs categorize the points based on the file weight attributes. Different points of the flexible display will be categorized based on values of the file weight attributes. At step 508, the one or more computer programs arrange the files in such a way that light weighted files float over heavy weighted files on the bent flexible display. For example, the user has selected image dimensions of files as file weight attributes, so smaller dimension files (which are lighter or with lower values of file weight attributes) will be floating over larger dimension files (which are heavier or with higher values of file weight attributes).

In other embodiments, based on historical bending patterns, the one or more programs automatically create different zones on the flexible display, such as a very light weight zone, a light weight zone, a medium weight zone, a heavy weight zone, etc. The one or more programs automatically arrange files into the different zones, in response to bending the flexible display by the user.

Figure 6:
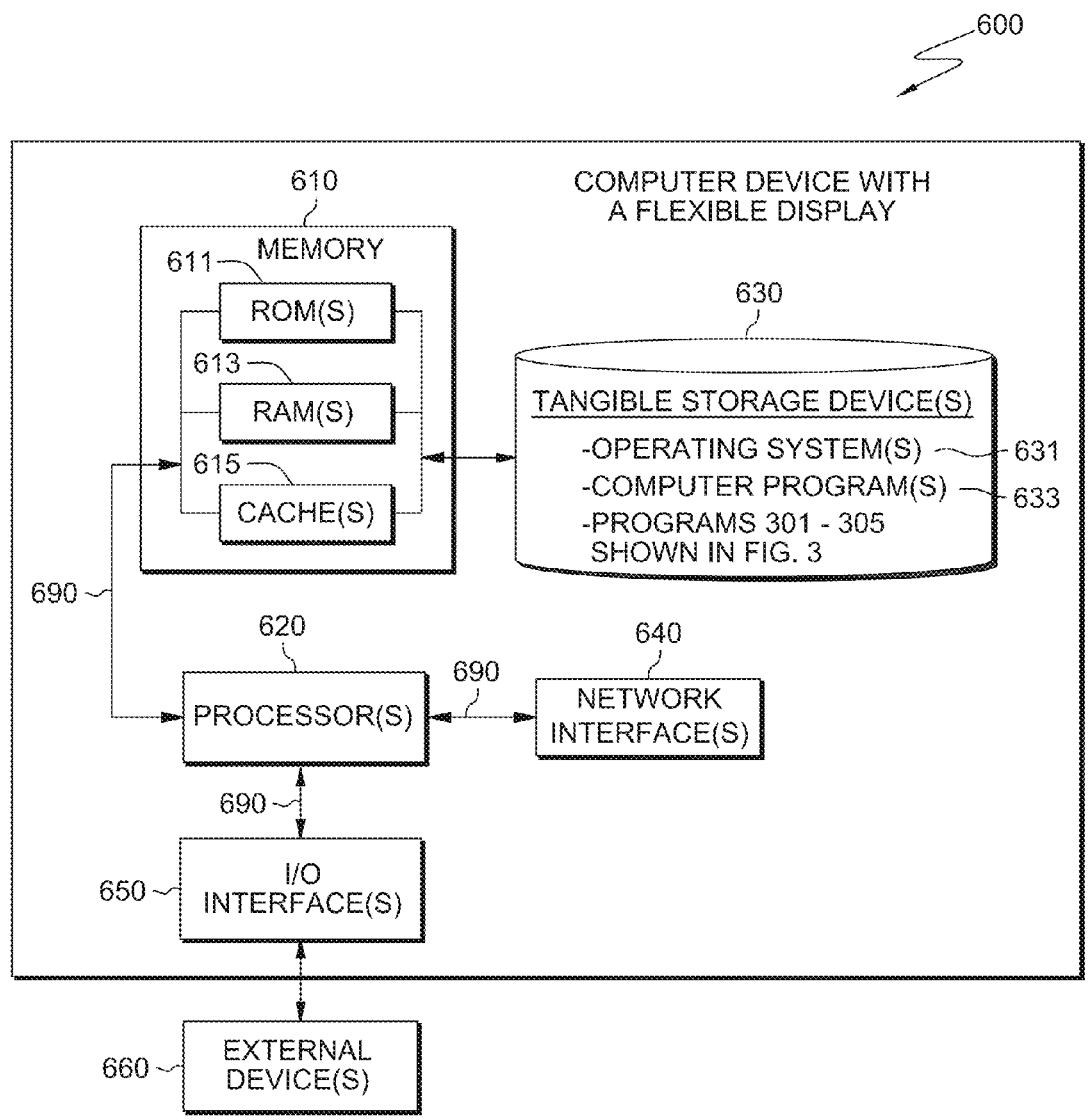
FIG. 6 is a diagram illustrating components of a computer device hosting one or more computer programs for using a bending pattern to arrange files on a flexible display, in accordance with one embodiment of the present invention.

FIG. 6 is a diagram illustrating components of computer device 600 hosting one or more computer programs (programs 301-305 shown in FIG. 3) for using a bending pattern to arrange files on a flexible display, in accordance with one embodiment of the present invention. It should be appreciated that FIG. 6 provides only an illustration of one implementation and does not imply any limitations with regard to the environment in which different embodiments may be implemented.

Referring to FIG. 6, computer device 600 includes processor(s) 620, memory 610, tangible storage device(s) 630, network interface(s) 640, and I/O (input/output) interface(s) 650. In FIG. 6, communications among the above-mentioned components of computing device 600 are denoted by numeral 690. Memory 610 includes ROM(s) (Read Only Memory) 611, RAM(s) (Random Access Memory) 613, and cache(s) 615. One or more operating systems 631 reside on one or more computer readable tangible storage device(s) 630. Programs 301-305 (shown in FIG. 3) for using a bending pattern to arrange files on a flexible display reside on one or more computer readable tangible storage device(s) 630. One or more computer programs 633 for other functionalities of computer device 600 also reside on one or more computer readable tangible storage device(s) 630. I/O interface(s) 650 allows for input and output of data with external device(s) 660 that may be connected to computing device

600. Network interface(s) 640 are for communications between computing device 600 and a computer network.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device, such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network (LAN), a wide area network (WAN), and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, and conventional procedural programming languages, such as the "C" programming language, or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture, including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the FIGs illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the FIGs. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for using a bending pattern to arrange files on a flexible display of an electronic device, the method comprising:

identifying, by a processor of the electronic device, a bending line on the flexible display, in response to bending the flexible display by a user;

calculating, by the processor, an affected area on the flexible display;

calculating, by the processor, a bending pattern;

calculating, by the processor, relative positions of points on the flexible display within the bending pattern;

categorizing, by the processor, the points, based on file weight attributes;

arranging, by the processor, the files, such that light weighted files float over heavy weighted files on the flexible display;

creating, by the processor, different zones on the flexible display, based on history of bending patterns; and displaying, by the processor, the files in the different zones.

2. The method of claim 1, further comprising:
receiving from the user, by the processor, an initiation of a mode to arrange files based on the file weight attributes and the bending pattern.

3. The method of claim 1, further comprising:
receiving, by the processor, user run-time selection of the file weight attributes.

4. The method of claim 1, further comprising:
receiving, by the processor, the file weight attributes which are set in prerequisite configuration.

5. The method of claim 1, further comprising:
defining, by the processor, an association between the file weight attributes and the bending pattern.

6. The method of claim 1, wherein the file weight attributes are defined based on one or more different attributes of the files, the one or more different attributes include file size, dimensions, context relevancy, confidentiality, and metadata.

7. A computer program product for using a bending pattern to arrange files on a flexible display of an electronic device, the computer program product comprising a computer readable storage medium having program code embodied therewith, the program code executable to:

identify, by a processor of the electronic device, a bending line on the flexible display, in response to bending the flexible display by a user;

calculate, by the processor, an affected area on the flexible display;

calculate, by the processor, a bending pattern;

calculate, by the processor, relative positions of points on the flexible display within the bending pattern;

categorize, by the processor, the points, based on file weight attributes;

arrange, by the processor, the files, such that light weighted files float over heavy weighted files on the flexible display;

create, by the processor, different zones on the flexible display, based on history of bending patterns; and display, by the processor, the files in the different zones.

8. The computer program product of claim 7, further comprising the program code executable to:
receive from the user, by the processor, an initiation of a mode to arrange files based on the file weight attributes and the bending pattern.

9. The computer program product of claim 7, further comprising the program code executable to:
receive, by the processor, user run-time selection of the file weight attributes.

10. The computer program product of claim 7, further comprising the program code executable to:
receive, by the processor, the file weight attributes which are set in prerequisite configuration.

11. The computer program product of claim 7, further comprising the program code executable to:
define, by the processor, an association between the file weight attributes and the bending pattern.

12. The computer program product of claim 7, wherein the file weight attributes are defined based on one or more different attributes of the files, the one or more different attributes include file size, dimensions, context relevancy, confidentiality, and metadata.

13. A computer system for using a bending pattern to arrange files on a flexible display of an electronic device, the computer system comprising:

one or more processors, one or more computer readable tangible storage devices, and program instructions stored on at least one of the one or more computer readable tangible storage devices for execution by at least one of the one or more processors, the program instructions executable to:

identify, by a processor of the electronic device, a bending line on the flexible display, in response to bending the flexible display by a user;

calculate, by the processor, an affected area on the flexible display;

calculate, by the processor, a bending pattern;

calculate, by the processor, relative positions of points on the flexible display within the bending pattern;

categorize, by the processor, the points, based on file weight attributes;

arrange, by the processor, the files, such that light weighted files float over heavy weighted files on the flexible display;

create, by the processor, different zones on the flexible display, based on history of bending patterns; and display, by the processor, the files in the different zones.

14. The computer system of claim 13, further comprising the program instructions executable to:
receive from the user, by the processor, an initiation of a mode to arrange files based on the file weight attributes and the bending pattern.

15. The computer system of claim 13, further comprising the program instructions executable to:
receive, by the processor, user run-time selection of the file weight attributes or the file weight attributes which are set in prerequisite configuration.

16. The computer system of claim 13, further comprising the program instructions executable to:
define, by the processor, an association between the file weight attributes and the bending pattern.

17. The computer system of claim 13, wherein the file weight attributes are defined based on one or more different attributes of the files, the one or more different attributes include file size, dimensions, context relevancy, confidentiality, and metadata.

* * * * *